United States Patent [19]

Shave

[11] 3,796,440
[45] Mar. 12, 1974

[54] TRAILER

[76] Inventor: Maurice F. Shave, 5319 Barton Rd., North Ridgeville, Ohio 44035

[22] Filed: July 17, 1972

[21] Appl. No.: 272,189

[52] U.S. Cl............. 280/106 T, 52/143, 280/34 A
[51] Int. Cl............................................ B62d 21/00
[58] Field of Search......... 280/34 A, 106 R, 106 T; 52/143

[56] References Cited
UNITED STATES PATENTS

| | | | |
|---|---|---|---|
| 3,231,121 | 1/1966 | Powell | 280/106 T |
| 2,646,285 | 7/1953 | Snyder | 280/106 T |
| 3,467,408 | 9/1969 | Regalia | 280/34 A |
| 3,101,819 | 8/1963 | Shinn | 280/106 T |
| 2,900,194 | 8/1959 | Delay | 280/34 A |

Primary Examiner—Robert R. Song
Attorney, Agent, or Firm—Fay, Sharpe and Mulholland

[57] ABSTRACT

A trailer for transporting a prefabricated section of a building, which section includes a roof bridging at least two sidewalls, one mounted near the rear of the trailer and the other near the front of the trailer. The trailer includes front, middle and rear frame portions. A towing connection is mounted on the front frame portion, the building section is supported on the middle portion and the trailer wheels are attached below the rear portion. Each sidewall of the building section is supported in the cavity of a channel beam which is welded to the upper surface of a crossbeam; the two crossbeams bridge across and are attached to one or more longitudinal beams which extend the full length of the trailer between the two sidewalls of the building. The joined longitudinal beams and crossbeams form a support section which comprises the middle frame portion. A vertical offset between the middle and rear frame portions allows the top of the generally rectangular midddle section to be below the top of the wheels mounted to its rear. According to one embodiment, the longitudinal beam or beams are formed in readily separable sections so that the overall length of the trailer can be varied.

2 Claims, 11 Drawing Figures

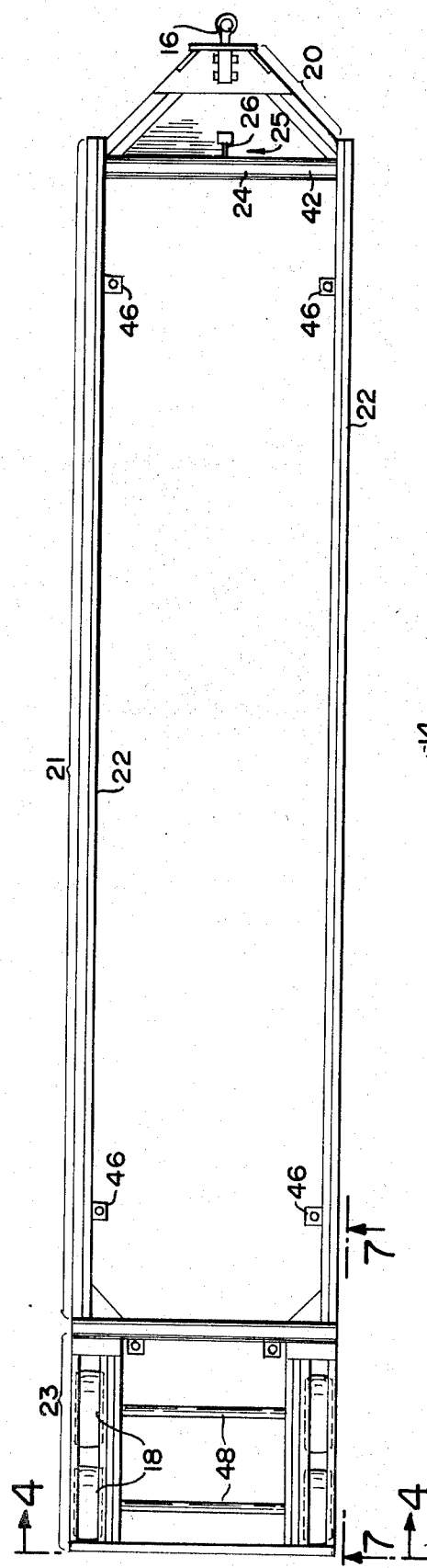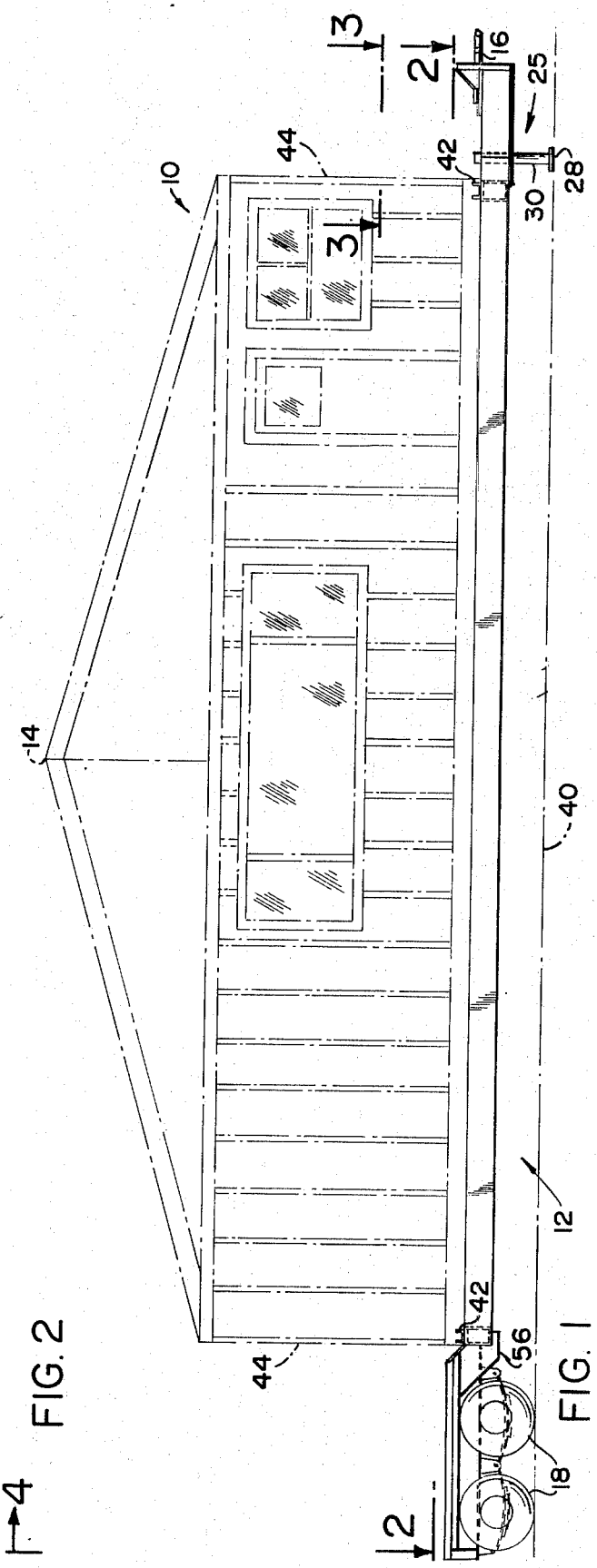

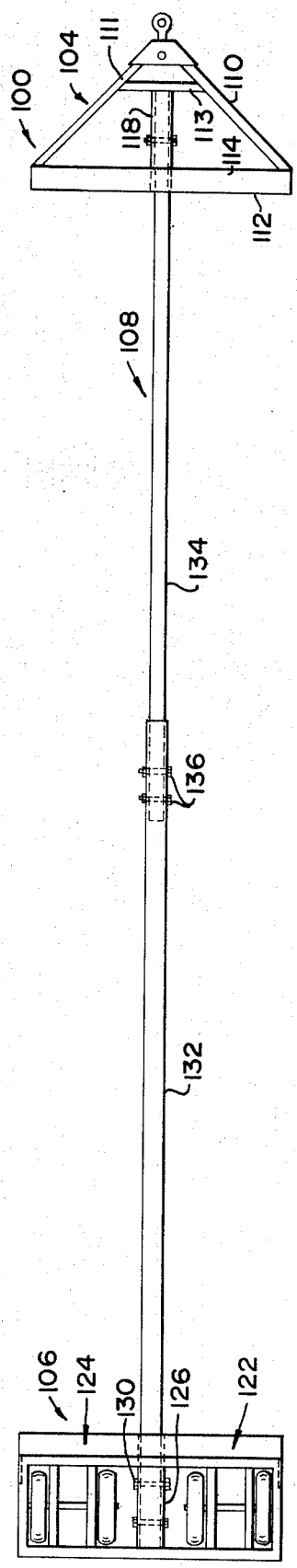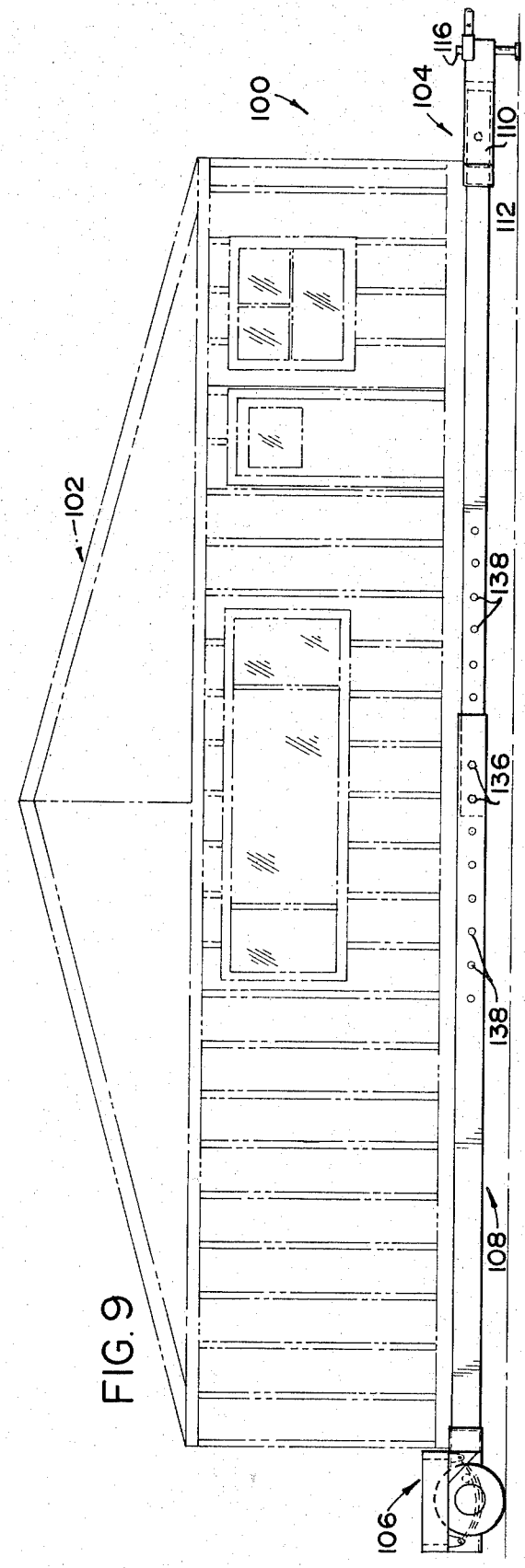
FIG. 10
FIG. 9

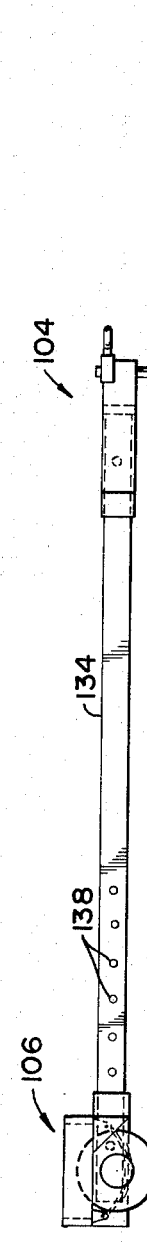

TRAILER

BACKGROUND OF THE INVENTION

Costs for the construction of single family dwellings, smaller office buildings, apartment houses, etc., have skyrocketed in recent years. As a consequence of the increased expense, the housing industry has begun to provide prefabricated shells which may be easily assembled on previously prepared foundations, thereby minimizing on-site labor costs. Interior room dividers, curtain walls and the like are also prefabricated but this fact is not significant to this invention.

The result of prefabrication has been a standarization of unit sizes throughout many sections of the industry and a standard prefabricated section of a single family dwelling is about 28 feet wide and 12 feet long. These 12 feet sections may be connected together to form as long a house as is desirable or necessary Each section includes two parallel, load-bearing sidewalls about 28 feet apart, bridged by a peaked roof section. During transportation and prior to assembly on the foundation and with other sections, temporary endwalls are nailed or otherwise affixed to the shell to minimize relative movement between the sidewalls and roof.

Particularly in northern sections of the country, a certain slope of roof is preferred for aesthetics as well as some building codes. The combination of this preferred, conventionally sloped roof and the two sidewalls mounted for transportation on a trailer weighs about six tons for each section of 12 feet. This combination of weight and the resulting heighth create problems of transportation.

There is no substantial engineering difficulty in designing a trailer which is strong enough to support the house section and which may be towed by any suitable tractor-trailer type of towing vehicle. However, on many of the interstate highways there is an additional limitation imposed by the allowable minimum bridge heighths of 13 feet, 6 inches. Unfortunately, from the dimensions standpoint, the crest of a peaked roof of a house 28 feet wide, when supported above the top of conventional trailer tires, extends higher than 13 feet 6 inches. These facts inspired the research and design leading to this invention.

BRIEF DESCRIPTION OF INVENTION

The novel trailer resulting includes a front frame portion having a mounting or towing attachment for connection to a conventional towing truck. Two pairs of wheels are mounted at the extreme rear of the trailer. Intermediate the towing bar and rear wheels is a support frame portion which includes at least one longitudinally extending beam assembly and crossbeams. The total length of the longitudinal beam assembly is over 28 feet in length and extends beyond the full width of the house section for which the trailer is designed. In one embodiment there are two longitudinally extending beams positioned as sidebeams and consists of two 10 inch channels with the legs of the same welded together to form a box-like structure; the welded unit provides adequate lateral and vertical structural stability for the intended purpose.

In the embodiment having two longitudinal beams, the front and rear crossbeams also preferably consist of welded 10 inch channels. Preferably the crossbeams are welded to the sidebeams and together they form a generally rectangular frame portion. Mounted on top of each of the crossbeams is a 6 inch channel with its legs extending vertically. The troughs formed by the 6 inch channels serve to confine the bottom edges of the sidewalls of the housing structure. Additionally, some type of vertically extending prongs or bolts are usually provided on or about the rectangular frame for mechanically locking the housing section in place. This locking means may or may not be associated with the 6 inch channels; the exact mechanical structure of this feature is not critical.

A rear frame portion mounted immediately above the wheels is connected to the rear most crossbeam by a plurality of welded gusset plates. The gusset plates allow the downward offset of the crossbeam whereby the bottom of the 6 inch channel is below the upper surface of the wheels mounted to its rear. This feature provides that the bottom of the housing section sidewalls will be below the upper surface of the wheels and thereby the peak of the roof will pass below the aforementioned 13 feet, 6 inch high bridges.

In a second embodiment of the invention, the longitudinal beam or beams are made in separable sections which permit the length of the trailer to be selectively varied.

BRIEF DESCRIPTION OF DRAWING

FIG. 1 is a side elevational view of the trailer of this invention with a housing mounted thereon.

FIG. 2 is a plan view of the trailer of FIG. 1 with the housing section removed.

FIGS. 9 and 10 are views similar to FIGS. 1 and 2, respectively, but showing a modified form of the invention.

FIG. 11 shows the FIG. 9 embodiment adjusted to a shortened configuration.

PREFERRED EMBODIMENT

Figure 4:
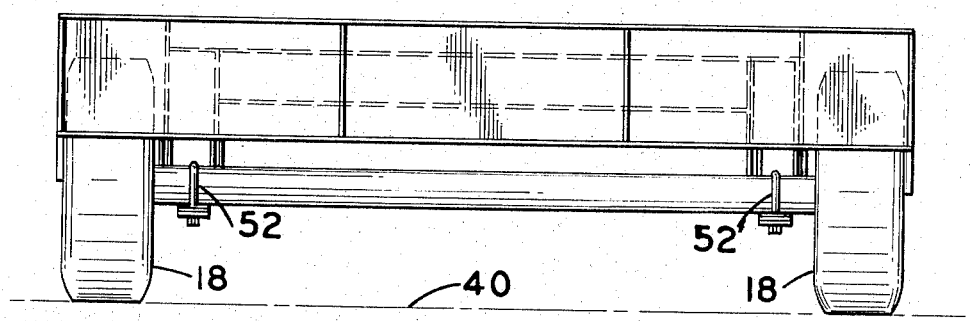
FIG. 4 is an enlarged elevational view of the back of the trailer.

Referring particularly to FIG. 1, a housing section 10 is mounted on a trailer 12 for transportation to a building site. The peak 14 of the roof is less than 13 feet 6 inches from the ground as mounted by virtue of the unique structure hereinafter described.

Conventionally, prefabricated housing sections of the type for which this trailer is designed are about 28 feet in width and 12 feet long, the 28 feet of house width extends from the front to the back of the trailer. As with all trailers designed to transport prefabricated housing sections, this trailer includes a towing connection 16 on the front and wheels 18 toward the rear. There is nothing unique to this invention about the combination of towing connection 16 and support wheels 18, per se. The novelty of the invention is in the unique structural combination of all the elements of the trailer.

Figure 3:
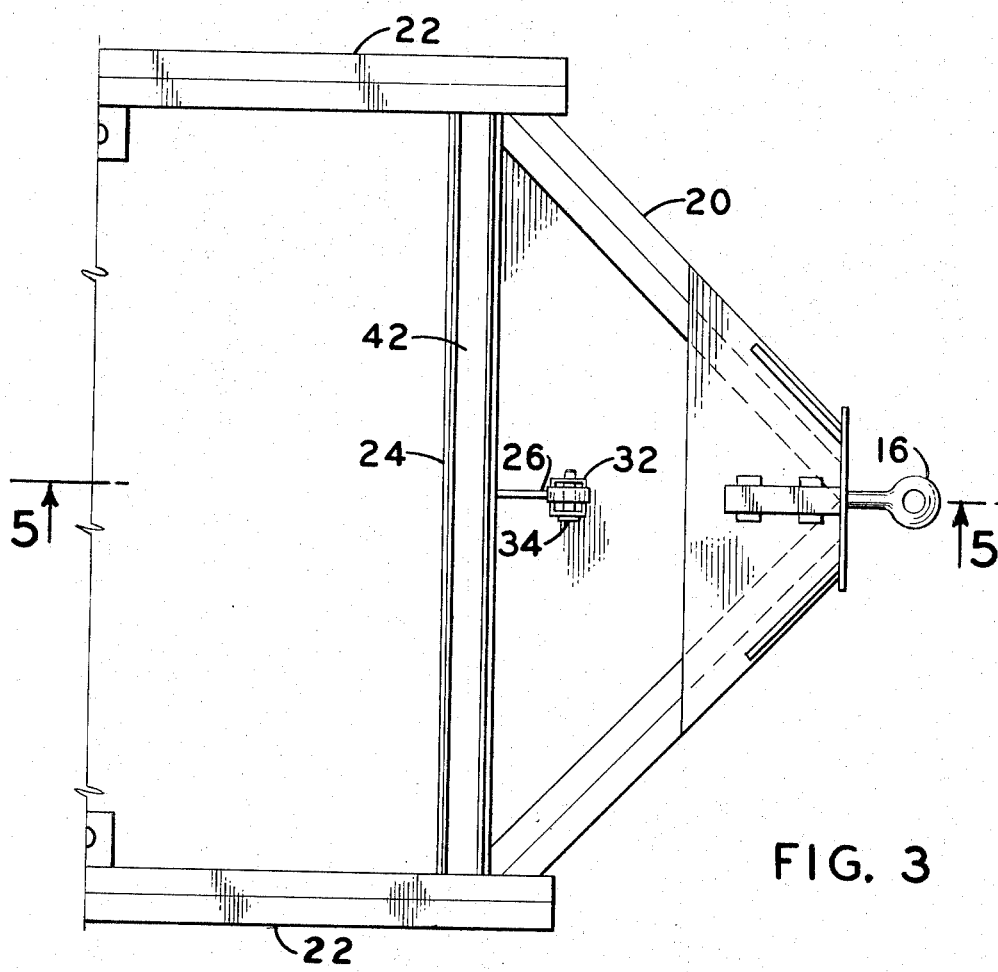
FIG. 3 is an enlarged plan view of the front of the trailer.
Figure 5:
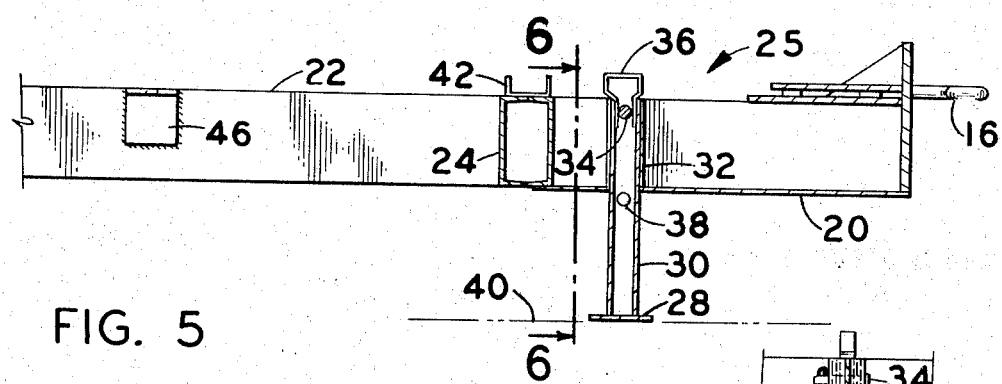
FIG. 5 is a sectional view of the front of the trailer taken along line 5—5 of FIG. 3.
Figure 6:
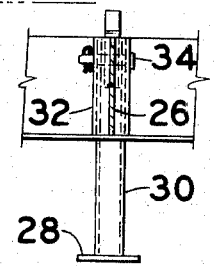
FIG. 6 is an elevational view of the bracket and support leg at the front of the trailer.

Turning particularly to FIGS. 3, 5 and 6, a V-shaped front frame portion 20 connects the towing connection 16 to the middle support frame 21 of the trailer which includes longitudinally extending sidebeams 22 and crossbeams 24. Together said beams form an integral rectangular shaped frame a little over 28 feet long and about 8 feet wide. Located to the rear of the trailer and vertically offset from the middle frame portion 21 is a rear portion 23 supported above wheels 18.

While the trailer is at rest and not connected to a tow truck, a vertically adjustable front support 25 rests on the ground to hold the rectangular frame 21 horizontal. The lower portion of the support includes a foot piece 28 connected to a vertically extending shaft 30 which in turn projects in telescopic relationship into a rectangular aperture 32. The aperture 32 is formed in a bracket 26 welded to the forward-most crossbeam 24. The telescoping members 26 and 30 are locked in position by a pin 34 which projects through mating openings in the elements. As best observed in FIG. 5, pin 34 may be removed, the shaft 30 lifted by handle 36 and the pin 34 reinserted in the lower aperture 38; thus, the foot piece 28 will be held above the ground 40 while the trailer is in motion.

As will be observed in the preferred embodiment, the crossbeams 24 have 6 inch channels 42 welded to their upper surfaces with the legs thereof projecting vertically. The bottoms of the housing sidewalls 44 rest in the troughs formed by the 6 inch channels. Obviously, during the transportation of the housing section some firm mechanical attachment must be made to hold the section in stable position on the trough. An example of such an attachment means comprises brackets 46, illustrated in FIGS. 2 and 5, which are welded to the inside of the sidebeam 22. Brackets 46 may include upwardly extending threaded prongs or merely provide apertures for such prongs which may project through wooden bracing elements or other equivalent structure fixed to the housing section. The exact mechanism for such attachments is not particularly significant and it has sometimes been found convenient to provide such upwardly extending prongs on the upper surfaces of the crossbeams 24.

Crossbeams 24 and sidebeams 22 are constructed in the same way; that is, they each include two 10 inch channels which are welded together at their leg portions to form rectangular box shaped cross-sections which are structurally stable in both vertical and transverse directions. The appearance of the welded channels is best illustrated by the section through beam 24 in FIG. 5; all others being identical, no additional sections appear necessary.

Moving now to the rear section 23 of the trailer, it includes two pairs of wheels having conventional axles 48 and springs 50. It will be observed in FIG. 4 that the axles 48 are attached to the center part of the leaf springs 50 by U-bolts 52. Downwardly extending brackets 54 provide appropriate means for connecting the distal ends of the leaf springs to the rear frame portion. As will be observed in FIGS. 7 and 8, channels such as used in the middle section of the trailer are employed here also for structural strength and stability.

Figure 7:
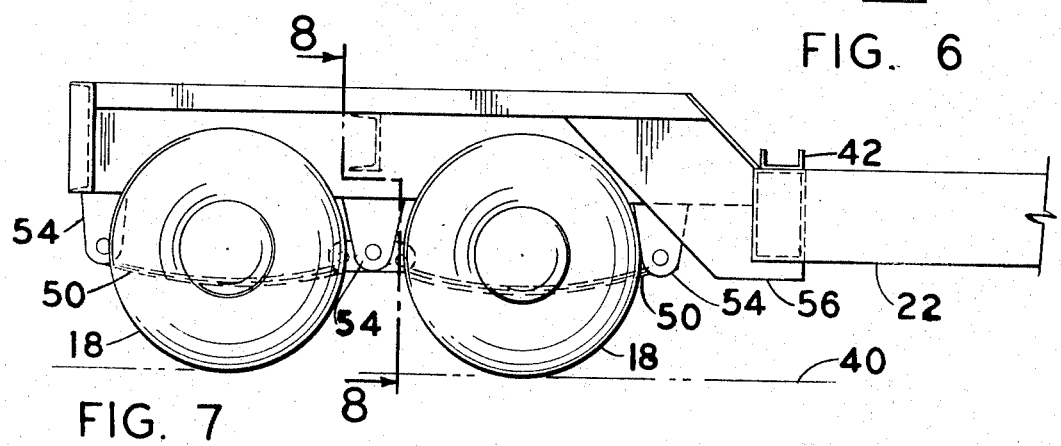
FIG. 7 is a side elevational view of the rear portion of the trailer.
Figure 8:
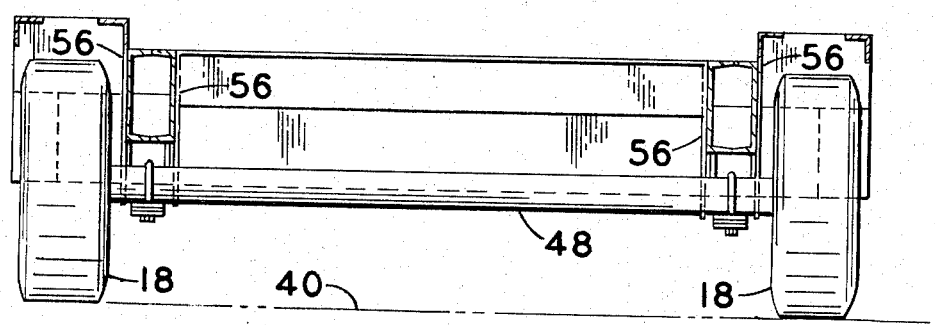
FIG. 8 is a sectional view taken along line 8—8 of FIG. 7.

One aspect of the frame forward of the wheels which is unique is the gusset plates 56, best illustrated in FIGS. 1 and 7. A plurality of such plates are provided for the stability of the structure, note particularly the four plates illustrated in FIG. 8. The particular shape of the gusset plates themselves is not as important as is the cross section of the same and good welding of the plates to both the rear-most crossbeam 24 and the rear frame section 23. Collectively the plates must be designed to support the 6-ton building section and the trailer weight in the particular orientation illustrated. The particular mathematical computations for this are not significant to the inventive concept herein described. What is significant is the downward offset of the upper surface of the crossbeams and sidebeams. This allows the supporting surfaces of the 6-inch I-beams 42 to be located below the upper surface of the tires 18. In this manner, the overall total heighth of the assembled housing section 10 on the trailer 12 will be lower than 13 feet 6 inches which is the minimum bridge heighth on certain interstate highways. This particular offset mechanism allows the mounted building section to pass under the bridges without any difficulty, whereas houses mounted in the conventional manner on a platform type of truck supported above such wheels would not pass under the same bridge. The downward offsetting feature of the gusset plate 56 is certainly one significant and critical concept. As illustrated, the bottoms of the crossbeams 24 and sidebeams 22 are approximately 8 to 10 inches above the ground, thereby making the upper surfaces of the same about 18–20 inches above the ground.

It will be recognized that those having ordinary skill in the art will see obvious modifications of the structure, particularly including the mounting structure for the wheels and the towing structure for the front of the trailer, as well as other sections thereof. An example of an obvious modification would be to have shorter length 6 inch channels 42 on the crossbeams 24. In the preferred embodiment the channels 42 are about 12 feet long. It is recognized that channel 42 could be eliminated altogether if suitable mechanical equivalents could be supplied to properly hold the sidewalls 44 of the housing section in position.

It will be observed that the sidewalls 44 of the housing section are vertically aligned in a plane passing through the associated crossbeam 24 such that the crossbeam 24 is the only load-bearing portion of the trailer involved. The trailer is particularly designed to prevent any sort of load support between the sidebeams 22. Any intermediate support would be detrimental to the shape of the prefabricated section. Such sections and houses are designed to be supported only by the sidewalls — they are not designed to have intermediate supporting sections. Prefabricated houses, as manufactured today, may have internal walls for defining rooms, but these are known as curtain walls and as a general rule provide no load-bearing strength. The house is designed to allow the sidewalls to support the total weight of the structure. With this in mind, it will be obvious that providing support intermediate the crossbeams 24 would tend to distort the prefabricated structure, perhaps permanently. For this reason, the improved load-bearing beams 24 are particularly important in both their location and their structure. Realigning the crossbeams 24 in any manner that would move any portion out of the plane defined by the sidewall 44 of the housing section would tend to allow undesirable distortion of the housing section.

FIGS. 9 through 11 show a second embodiment of the invention which allows the trailer to be adjusted in length for handling various size structures or, to make the return trip to the factory easier by allowing the trailer to be reduced to a short easily hauled configuration. Specifically, FIGS. 9 and 10 show the trailer 100 assembled in the length suitable for hauling a prefabricated housing section 102. Trailer 100 includes a tongue or towing section 104 and a wheel or carriage section 106. The tongue and carriage section are interconnected by a longitudinally extending beam assembly 108.

The tongue section 104 can be formed generally as described in the FIG. 1 embodiment or, alternately, with a substantially different configuration. In the subject embodiment it is formed as a welded construction from a plurality of channel members 110 through 115. Channels 112 and 114 have their legs welded together to form a box beam. An adjustable front support 116 is formed generally in the manner of the front support 25 described with reference to the FIG. 1 embodiment. Front support 116 is carried on suitable cross-members connected between the channels 111 and 110. One aspect of the FIGS. 9 through 11 embodiment which differs from the FIGS. 1 through 8 embodiment with respect to the tongue section 104 is that means are provided to define a generally rectangular, longitudinally extending section 118. Section 118 is arranged to slidably receive the end of the longitudinally extending beam member 108. As shown, bolt or pin openings 120 are formed through the lateral sides of section 118. As it will be described hereafter, a similar set of bolt openings are formed through the forward end of longitudinally extending beam 108. This permits suitable bolts or pins to be inserted through the openings to firmly affix the tongue section to the longitudinally extending beam section. Additionally, removal of the bolts allows the sections to be separated for adjusting the overall length of the trailer in a manner subsequently be described.

The wheel or carriage section 106 is also formed from welded structural members, such as channels, includes a pair of wheel and axle assemblies 122 and 124 which are positioned in generally side by side alignment. This permits the length of the carriage section 106 to be reduced compared to the corresponding section of the FIGS. 1 through 8 embodiment. Carriage section 106 is designed so as to define a longitudinally extending rectangular section 126 which can slidably receive the rear end of the beam member 108. As noted, a plurality of bolt holes or the like 130 are formed through the rectangular section of the carriage to allow suitable bolts to be passed through similar openings in the longitudinal beam 108.

The longitudinally extending beam section 108 is, in the subject embodiment, formed of two rectangular box beams 132 and 134 which are telescopically interconnected generally at the center of the assembly by suitable bolts or pins 136 which can be positioned through aligned ones of openings 138. As shown, the plurality openings are spaced so that a substantial adjustment can be made in the overall length of the main center beam assembly. In the subject embodiment, the right beam 134 is slightly smaller than the left beam and is adapted to be received therein. Additionally, the rectangular section of the tongue assembly 104 has its opening formed so as to closely receive the beam 124. As can be appreciated, the rectangular section of the carriage assembly 106 is sufficiently large to closely receive the left hand beam section 126. Consequently, the left hand beam section 122 can be removed by disconnecting it from the carriage section and the beam 122. Thereafter, beam 122 can be received in the carriage section and the overall length of the trailer reduced by half. FIG. 11 shows the trailer and this shortened position.

It should be appreciated, that the center beam assembly can be formed from additional sections if desired to permit of wider variations in the overall length of the assembly.

The invention has been described in great detail sufficient to enable one of ordinary skill in the art to make and use the same. Obviously, modifications and alterations of the preferrted embodiment will occur to others upon a reading and understanding of the specification and it is our intention to include all such modifications and alterations as part of our invention insofar as they come within the scope of the appended claims.

I claim:

1. In the combination of a trailer and a prefabricated section of a building,
    said building including a roof bridging at least two sidewalls, one sidewall being located near the front of the trailer and the other being located near the rear of the trailer,
    a plurality of supporting wheels mounted beneath the rear portion of the trailer and a towing connection mounted on the front portion of said trailer,
    frame means comprising the middle portion of the trailer extending between the front and rear portions, said frame including (1) at least two longitudinally positioned beams extending the full length between the two building sidewalls and (2) two crossbeams bridging across and connected to the ends of the longitudinal beams and extending transversely thereto,
    means for mechanically connecting the building section to the middle portion of the trailer to prevent relative movement between the two,
    the improvement comprising:
    said mechanical connecting means comprising (1) a plurality of vertically extending prongs mounted on one of the building section and the middle portion of the trailer and (2) a plurality of mating brackets with apertures mounted on the other, said prongs and apertures being located such that the prongs project through the apertures when the building endwalls rest on the trailer,
    each of the crossbeams lying in a plane which is coextensive with one of the sidewalls located near the front or rear of the trailer, said crossbeams being the sole direct load-bearing portions of the trailer,
    channel members joined to the top surface of each of said crossbeams with the legs of said channels projecting vertically to serve as a trough for the sidewalls of said building section to prevent gross relative longitudinal movement between the two but without any rigid mechanical connection, and
    off-setting means between the rear-most crossbeam and rear portion of the trailer,
    said off-setting means being for allowing the bottom of the housing sidewalls to rest in the channel, the supporting surface of which is below the upper surface of the wheels.

2. The combination of claim 1 wherein the frame includes two of said longitudinally extending beams which constitute sidebeams, and wherein standard 10 inch channels are its sidebeams and crossbeams and the tops of said 10 inch beams are no higher than about 20 inches from the surface of level ground beneath the wheels.

* * * * *